N. H. HAND.
Improvement in Frames for Rock-Drilling Machines.
No. 133,222.  Patented Nov. 19, 1872.
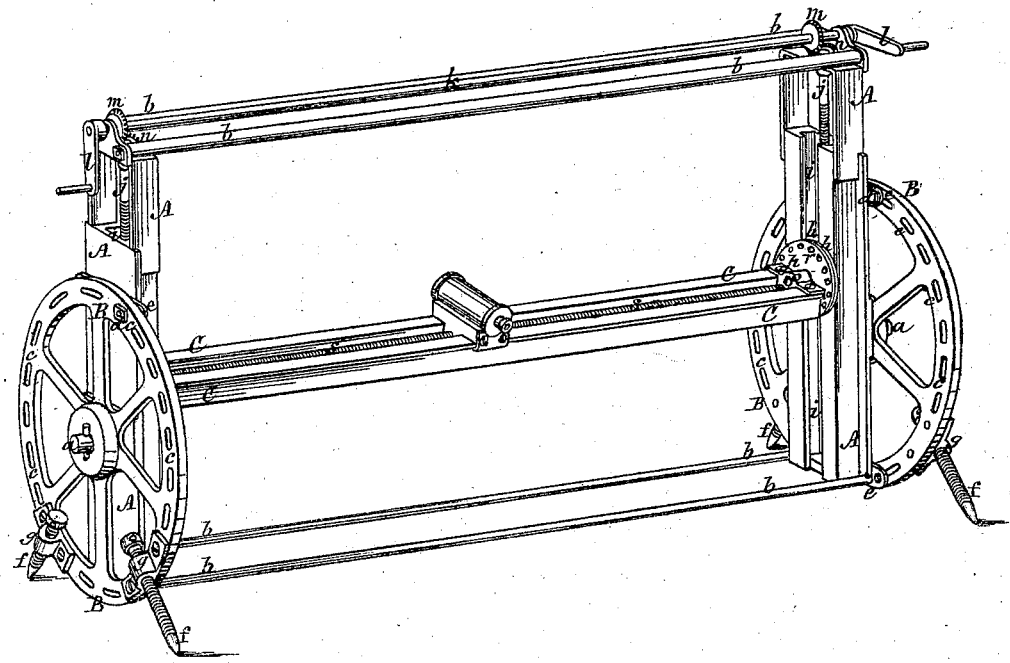
Witnesses.
D. P. Cowl
Edmund Masson
Inventor.
Nathan H. Hand.
By Atty. A. B. Stoughton.

UNITED STATES PATENT OFFICE.

NATHAN H. HAND, OF PITTSFORD, VERMONT.

IMPROVEMENT IN FRAMES FOR ROCK-DRILLING MACHINES.

Specification forming part of Letters Patent No. 133,222, dated November 19, 1872.

*To all whom it may concern:*

Be it known that I, NATHAN H. HAND, of Pittsford, in the county of Rutland and State of Vermont, have invented certain new and useful Improvements in Frames for Rock-Drilling or Rock-Channeling Machines; and that the following is a full, clear, and exact description of the same, reference being had to the accompanying drawing making a part of this specification, and which represents the frame in perspective.

The object and purpose of my invention are to construct a frame for carrying and operating drilling or channeling tools in a quarry, so that said frame may be conveniently transported and placed, and be made readily adjustable for drilling holes or cutting channels or grooves in either vertical, horizontal, or inclined directions, as may be required.

To enable others skilled in the art to make and use my invention, I will proceed to describe the same with reference to the drawing.

Upon the side or end pieces A A are made journals $a$ $a$ for receiving the wheels B B, upon which the frame is moved and supported when necessary. The side or end pieces A A are tied and braced by rods $b$ $b$, extending from one to the other, and thus constitute a rigid frame, which can be readily moved and placed, occupies but little space, and can be adjusted, as will be hereinafter explained. In the rims of the wheels are made a series of openings, $c$ $c$, through which screw-bolts $d$ may pass, said bolts also passing through lugs $e$ on the side or end pieces A, so that the frame which is supported by the journals $a$ $a$ in the wheels B may be swung into any position from a vertical to a horizontal one, and be there secured by said screw-bolts, which lock the frame and wheels together. In each wheel there is a pair of legs, $f$ $f$, arranged radially, or nearly so, in said wheels, so as to brace against each other. These legs $f$ are made of screw-bolts, which pass through nuts $g$ on the side of the wheel-rim, and are pointed so as to bear firmly against the bed of the rock or other base; and their heads are furnished with holes, through or into which a lever may be placed to turn said bolts, and so raise, lower, or adjust the frame, or hold it when adjusted. When the wheels B are bolted to the frame they become a part of the frame for some purposes; as, for instance, the frame may be supported upon or by the wheels, and be braced by the screw-legs $f$; or the frame, wheels, and all may be raised up so as to be supported on the legs alone. The placing of the screw-legs upon the wheels economizes space, and admits of placing the frame close up to the ledge that the tools are to work upon. In grooves or ways $i$ $i$, made in the side or end pieces A, blocks or heads $h$ are caused to traverse by means of screw-rods $j$ $j$, which pass through said blocks, and which rods are turned simultaneously through a shaft, $k$, and the bevel-pinions $m$ $n$, said shaft $k$ being turned by a crank or cranks, $l$ $l$. To these blocks or heads $h$ is connected, by journals $o$, one at each end, upon which it may freely revolve or turn, a supporting-bar, C, upon the ends of which are disks or rims $p$, which move in close proximity to similar disks or rims upon the heads or blocks $h$, and through these disks or rims are a series of holes, so that, by pins $r$, the supporting-bar C may be turned into any desired position within the entire circle and there held. Upon this bar or beam C is placed the mechanism for holding and operating the drilling or channeling tools, and such holding and operating mechanism may be traversed longitudinally of the supporting-bar $c$ by means of a screw-rod, $s$, that is turned in any of the usual well-known ways.

The drill or channel-cutting tool, and the holder and operating mechanism for moving such tools, may be of any of the well-known kinds; and as they do not constitute any part of this present invention or application, I do not particularly describe them.

From the above construction it will be seen that though this frame is simple and compact it possesses a degree of adjustment that makes it adaptable to any condition of the stone or quarry where it is to be worked; and the drilling or channeling tools can be moved laterally, vertically, horizontally, or set at any angle of inclination with regard to the bed or face of the quarry that may be desirable. When the drills or channeling-tools are operated the beam C is permanently attached to the end pieces of the frame; and with the beam so permanently fixed the frame is susceptible of any desirable degree of adjustment within practical limits.

Instead of a screw-shaft, $s$, for moving the tool-holder, a rack and pinion may be used, which would be quicker in its movement.

Having thus fully described my invention, what I claim therein as new, and desire to secure by Letters Patent, is—

1. The combination of the swinging frame, carrying and sustaining wheels and devices by which the two are attached and detached, so that the wheels may be used to support the frame rigidly, form a central support for it to swing on, and to move it about from place to place, as may be required, and substantially as set forth.

2. In combination with the swinging frame and with the wheels for carrying and supporting said frame, the adjusting-legs $ff$ passing through nuts on said wheels, substantially as and for the purpose described.

3. In combination with the frame-pieces A A and the adjustable heads or blocks $h\,h$ moving or movable thereon, the supporting-beam C pivoted to said heads or blocks, and susceptible of being turned and held in any desired position thereon, as and for the purpose described.

4. In combination with the supporting-beam $c$ and main frame A, rocking or rolling in the wheels as a center, a drilling or channeling tool-holder capable of being traversed on said beam, as and for the purpose described and represented.

NATHAN H. HAND.

Witnesses:
A. B. STOUGHTON,
EDMUND MASSON.